(12) United States Patent
Edwards et al.

(10) Patent No.: US 11,443,178 B2
(45) Date of Patent: Sep. 13, 2022

(54) DEEP NEURAL NETWORK HARDENING FRAMEWORK

(71) Applicant: International Business Machines Corporation, Armonk, NY (US)

(72) Inventors: Benjamin J. Edwards, Ossining, NY (US); Taesung Lee, Ridgefield, CT (US); Ian M. Molloy, Chappaqua, NY (US); Dong Su, Elmsford, NY (US)

(73) Assignee: Interntional Business Machines Corporation, Armonk, NY (US)

( * ) Notice: Subject to any disclaimer, the term of this patent is extended or adjusted under 35 U.S.C. 154(b) by 1062 days.

(21) Appl. No.: 15/844,442

(22) Filed: Dec. 15, 2017

(65) Prior Publication Data
US 2019/0188562 A1   Jun. 20, 2019

(51) Int. Cl.
*G06N 3/08* (2006.01)
*H04L 9/40* (2022.01)
*G06N 3/04* (2006.01)

(52) U.S. Cl.
CPC .................. *G06N 3/08* (2013.01); *G06N 3/04* (2013.01); *H04L 63/1441* (2013.01)

(58) Field of Classification Search
CPC .......... G06N 3/08; G06N 3/04; G06N 3/0427; G06N 5/045; H04L 63/1441
See application file for complete search history.

(56) References Cited

U.S. PATENT DOCUMENTS

| 7,991,714 B2 | 8/2011 | Widrow et al. |
| 9,477,925 B2 | 10/2016 | Seide et al. |
| 2017/0148433 A1 | 5/2017 | Catanzaro et al. |

OTHER PUBLICATIONS

Papernot, Nicolas, et al. "The limitations of deep learning in adversarial settings." 2016 IEEE European symposium on security and privacy (EuroS&P). IEEE, 2016. https://ieeexplore.ieee.org/stamp/stamp.jsp?tp=&arnumber=7467366 (Year: 2016).*

(Continued)

*Primary Examiner* — Kakali Chaki
*Assistant Examiner* — Michael H Hoang
(74) *Attorney, Agent, or Firm* — Stephen J. Walder, Jr.; Jeffrey S. LaBaw

(57) ABSTRACT

Mechanisms are provided to implement a hardened neural network framework. A data processing system is configured to implement a hardened neural network engine that operates on a neural network to harden the neural network against evasion attacks and generates a hardened neural network. The hardened neural network engine generates a reference training data set based on an original training data set. The neural network processes the original training data set and the reference training data set to generate first and second output data sets. The hardened neural network engine calculates a modified loss function of the neural network, where the modified loss function is a combination of an original loss function associated with the neural network and a function of the first and second output data sets. The hardened neural network engine trains the neural network based on the modified loss function to generate the hardened neural network.

19 Claims, 5 Drawing Sheets

(56) References Cited

OTHER PUBLICATIONS

Mathieu, Michael, Camille Couprie, and Yann LeCun. "Deep multi-scale video prediction beyond mean square error." arXiv preprint arXiv: 1511.05440 (2015). https://arxiv.org/pdf/1511.05440.pdf (Year: 2015).*
Zheng, Stephan, et al. "Improving the robustness of deep neural networks via stability training." Proceedings of the IEEE conference on computer vision and pattern recognition. 2016. https://www.cv-foundation.org/openaccess/content_cvpr_2016/papers/Zheng_Improving_the_Robustness_CVPR_2016_paper.pdf (Year: 2016).*
C. Xu et al., "Multi-loss Regularized Deep Neural Network," in IEEE Transactions on Circuits and Systems for Video Technology, vol. 26, No. 12, pp. 2273-2283, Dec. 2016, doi: 10.1109/TCSVT.2015.2477937. https://ieeexplore.ieee.org/stamp/stamp.jsp?tp=&arnumber=7258343 (Year: 2016).*
Nguyen, Anh, Jason Yosinski, and Jeff Clune. "Deep neural networks are easily fooled: High confidence predictions for unrecognizable images." Proceedings of the IEEE conference on computer vision and pattern recognition. 2015. (Year: 2015).*
[Item U continued] https://www.cv-foundation.org/openaccess/content_cvpr_2015/papers/Nguyen_Deep_Neural_Networks_2015_CVPR_paper.pdf.*
Yue, Jack C., and Murray K. Clayton. "A similarity measure based on species proportions." Communications in Statistics-theory and Methods 34.11 (2005): 2123-2131. http://citeseerx.ist.psu.edu/viewdoc/download?doi=10.1.1.526.6982&rep=rep1&type=pdf (Year: 2005).*
Anonymous, "A novel way of training a biometric engine by staggering the training beyond the enrollment process", IP.com Prior Art Database Technical Disclosure, IP.com No. IPCOM000214923D, Feb. 14, 2012, 7 pages.
Anonymous, "Deriving Graph Structures within Deep Architectures for Robust Handling of Limited Training Data", IP.com Prior Art Database Technical Disclosure, IP.com No. IPCOM000249657D, Mar. 15, 2017, 5 pages.
Carlini, Nicholas et al., "Towards Evaluating the Robustness of Neural Networks", 2017 IEEE Symposium on Security and Privacy, May 22-24, 2017, pp. 39-57.
Goodfellow, Ian J. et al., "Explaining and Harnessing Adversarial Examples", 3rd International Conference on Learning Representations (ICLR2015), arXiv: 1412.6572v3 [stat.ML], Mar. 20, 2015, pp. 1-11.
High, Rob, "The Era of Cognitive Systems: An Inside Look at IBM Watson and How it Works", IBM Corporation, Redbooks, Dec. 12, 2012, 16 pages.
Huang, Ruitong et al., "Learning with a Strong Adversary", Under review as a conference paper at ICLR2016, arXiv: 1511.03034v6 [cs.LG], Jan. 16, 2016, pp. 1-12.
Kiran, KSR, "User Authentication using Biometric Data", IP.com Prior Art Database Technical Disclosure, IP.com No. IPCOM000206768D, May 6, 2011, 4 pages.
Lee, Dong-Hyun, "Pseudo-Label: The Simple and Efficient Semi-Supervised Learning Method for Deep Neural Networks", The 30th International Conference on Machine Learning (ICML) 2013 Workshop: Challenges in Representation Learning (WREPL), Jun. 16-21, 2013, 6 pages.
Mak, Man-Wai, "Deep Learning and Deep Neural Networks", Dept. of Electronic and Information Engineering, The Hong Kong Polytechnic University, Apr. 13, 2017, 35 pages.
Papernot, Nicolas et al., "cleverhans v2.0.0: an adversarial machine learning library", Cornell University Library, arXiv: 1610.00768v4 [cs.LG], Oct. 5, 2017, pp. 1-7.
Papernot, Nicolas et al., "Distillation as a Defense to Adversarial Perturbations against Deep Neural Networks", Accepted to the 37th IEEE Symposium on Security & Privacy, IEEE, 2016, arXiv: 1511.04508v2 [cs.CR], Mar. 14, 2016, pp. 1-16.
Rani, Chandan et al., "An Efficient Signature Based Biometric System Using BPNN", International Journal of Innovative Research and Advanced Studies (IJIRAS); vol. 3, Issue 6, May 2016, pp. 5-8.
Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

* cited by examiner

DEEP NEURAL NETWORK HARDENING FRAMEWORK

BACKGROUND

The present application relates generally to an improved data processing apparatus and method and more specifically to mechanisms for providing a deep neural network hardening framework.

Deep learning is part of a broader family of machine learning methods based on learning data representations as opposed to task-specific algorithms. Some representations are loosely based on interpretation of information processing and communication patterns in a biological nervous system, such as neural coding that attempts to define a relationship between various stimuli and associated neuronal responses in the brain. Research attempts to create efficient systems to learn these representations from large-scale, unlabeled data sets.

Deep learning architectures such as deep neural networks, deep belief networks, and recurrent neural networks, have been applied to fields including computer vision, speech recognition, natural language processing, audio recognition, social network filtering, machine translation, and bioinformatics where they produced results comparable to, and in some cases superior to, human experts.

Neural network based deep learning is a class of machine learning algorithms that use a cascade of many layers of nonlinear processing units for feature extraction and transformation. Each successive layer uses the output from the previous layer as input. The algorithms may be supervised or unsupervised and applications include pattern analysis (unsupervised) and classification (supervised). Neural network based deep learning is based on the learning of multiple levels of features or representations of the data with higher level features being derived from lower level features to form a hierarchical representation. The composition of a layer of nonlinear processing units of the neural network used in a deep learning algorithm depends on the problem to be solved. Layers that have been used in deep learning include hidden layers of an artificial neural network and sets of complicated propositional formulas. They may also include latent variables organized layer-wise in deep generative models such as the nodes in deep belief networks and deep Boltzmann machines.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions which are executed by the processor to specifically configure the processor to implement a hardened neural network framework. The method comprises configuring the data processing system to implement a hardened neural network engine that operates on a neural network to harden the neural network against evasion attacks and generates a hardened neural network, and generating, by the hardened neural network engine, a reference training data set based on an original training data set. The method further comprises processing, by the neural network, the original training data set and the reference training data set to generate first and second output data sets, and calculating, by the hardened neural network engine, a modified loss function of the neural network. The modified loss function is a combination of an original loss function associated with the neural network, and a function of the original training data set and the reference data set, and the first and second output data sets. Moreover, the method comprises training, by the hardened neural network engine, the neural network based on the modified loss function to generate the hardened neural network.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1A:
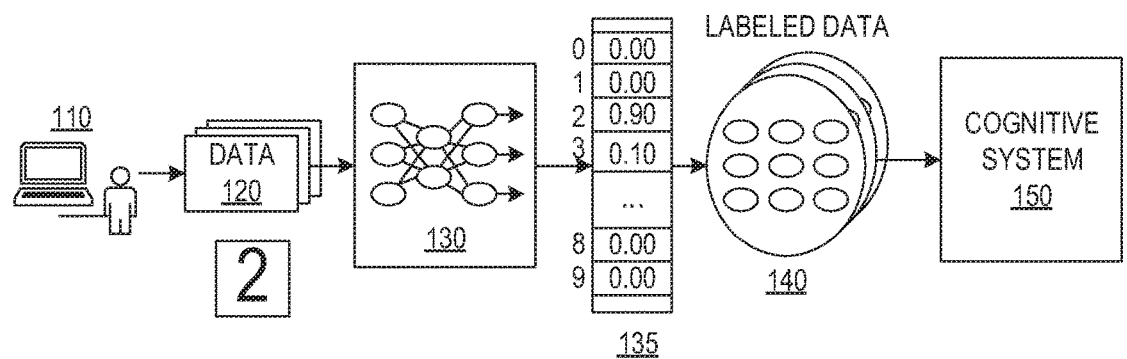
FIGS. 1A and 1B are block diagrams illustrating the problem addressed by the present invention.

Various cognitive systems may utilize trained models, such as trained neural networks, to perform their cognitive operations. For example, a neural network implemented model may be used to provide image analysis, facial recognition, fingerprint or retinal image recognition, speech pattern analysis, or the like, for a cognitive security system, such as an image recognition surveillance system, a biometric authentication system, etc. Often times, such neural networks, and other types of machine learning or cognitive models, are utilized in or with cognitive systems to perform a classification operation upon which the cognitive system operates to perform a cognitive operation, e.g., classifying an input into one of a plurality of predetermined classifications (classes) which is then used to perform a more complex analysis or reasoning operation using cognitive system mechanisms.

Attackers may attempt to thwart such systems by performing evasion attacks, such as gradient-based attacks. An evasion attack on a cognitive system, e.g., on the neural network or other cognitive or machine learning model implemented by the cognitive system, involves the attacker attempting to fool the model to misclassify a manipulated input. For example, an attacker may make almost imperceptible manipulations on input data to generate adversarial input, where an adversarial input is an input formed by applying small, but intentional, perturbations to data samples from a data set (where the term "data set" as used herein refers to a set of one or more data samples), such that the perturbed input results in the model, e.g., neural network, outputting an incorrect answer with high confidence. The adversarial input will cause the neural network to misclassify the input and thus, malfunction, resulting in a breach of security. Such misclassification may prevent the system from correctly classifying valid inputs as valid, or allow invalid inputs to be incorrectly classified as valid. For example, an attacker attempting to fool a facial recognition neural network may purposefully add small imperfections to their appearance, and thereby generate an adversarial input, in an attempt to fool the facial recognition into misclassifying the attacker as an authorized individual.

Such evasion attacks, e.g., FGSM and the like, tend to be classifiable as white box attacks and are dependent upon the attacker identifying a correct gradient of the loss surface of the neural network or other cognitive or machine learning model. The loss surface, also referred to as the loss function or cost function, in the context of machine learning, neural networks, and cognitive system operations, is a function that represents the price paid for inaccuracy of predictions, e.g., the cost of inaccuracy in a classification prediction.

A white box attack involves the attacker having full access to the cognitive system and the attacker may in fact be a user of the cognitive system, as opposed to black box attacks where the attacker does not have access to the endpoints of a secure transaction, or a gray box attack in which the attacker is able to interact with one or more of the endpoints via observation and/or alteration of system parts and processes. Such white box attacks are mostly based on gradients, as described in Goodfellow et al., "Explaining and Harnessing Adversarial Examples," ICLR 2015, Mar. 20, 2015. For example, the JSMA attack is a type of white box attack that greedily modifies one pixel at a time until the image is classified incorrectly. The FGSM attack takes a single step, for all pixels, in the direction of the gradient. The Carlini and Wagner attack uses gradient descent to optimize a custom loss function.

Many defense approaches to such white box attacks use a classifier to identify an adversarial input, i.e. classify an input as either a normal input or an adversarial input. However, these approaches often fail when the classifier itself is considered as part of the white box attack. Thus, it would be beneficial to be able to harden models used in cognitive systems, and hence the cognitive system itself, against evasion attacks, e.g., gradient based attacks, by preventing such adversarial inputs from causing the model to misclassify the input data.

In addressing these issues and providing such mechanisms, the illustrative embodiments, rather than using a classifier to identify an adversarial input, provides mechanisms for hardening the neural network by training the neural network based on a derived reference input that approximates an adversarial input. The mechanisms of the illustrative embodiments implement a training methodology based on a modified neural network loss function that ensures that if there are small differences between the training input data and the derived reference input, then the difference between the output of the neural network for the training input data and the output generated based on processing the derived reference input via the neural network, is also small, such that a misclassification does not occur, i.e. the differences in the outputs generated by the neural network based on the input data is commensurate with the differences between training input data and derived reference input data upon which the neural network operates to generate the outputs.

That is, with adversarial inputs, the adversary wishes to make small, almost imperceptible, changes to the input that will result in a relatively large difference in the output of the neural network. This is so that the adversary is not discovered while attempting to thwart the operation of the neural network and the cognitive system as a whole, as large differences in inputs may be more readily identifiable as adversarial and corresponding protections may be initiated, such as filtering out such inputs, blocking access to the neural network and/or cognitive system, raising alerts, logging the attack, or otherwise initiating protections. By forcing, through training of the neural network using the mechanisms of the illustrative embodiments, small changes in the input to cause only small changes in the output of the neural network, such adversarial input based attacks, e.g., evasion or other gradient based attacks, are rendered ineffectual as the small perturbations will not appreciably affect the output of the neural network. To the contrary, with a neural network hardened by the training of the illustrative embodiments, if an adversary wishes to cause a large change in the output of the neural network, the adversary would need to make relatively large and noticeable changes to the input data fed into the neural network, leading to detection and instigation of other mechanisms to prevent such input from causing unwanted operations of the cognitive system.

In other words, the mechanisms of the illustrative embodiments leverage the derived reference input data and force the neural network to produce a similar output when the input and the reference input are similar, thereby preventing overfitting of the loss function of the neural network. The derived reference input data may be generated using any known perturbation technique, any sampling technique to sample the input data and thereby deriving the reference input, or the like. A loss function L' is provided that combines the original loss function L of the neural network (typically given with the neural network model) with a function of the difference in the input and reference input, and the difference in the corresponding outputs from processing the input and reference input via the neural network, i.e. Delta (X, X', Y, Y'), where X is the input data, X' is the derived reference input data, Y is the output generated by the neural network based on processing of the input data X, and Y' is the output generated by the neural network based on processing of the derived reference input X'. The neural network is optimized using this combined loss function L' to minimize both Delta(X, X', Y, Y') and L.

An example implementation of Delta(X, X', Y, Y') is cos(Y, Y')/cos(X, X'), where cos is a cosine function over vectors, and X, X', Y, and Y' are input and output vectors or the vectors obtained by flattening the matrices X, X', Y, and Y'. By setting the training loss function as L'=L+λ*Delta (X,X',Y,Y'), where λ is a model specific loss weight parameter that may be tuned, and neural network optimization algorithms, such as stochastic gradient descent, AdaGrad, Adam, and so forth, may be applied to update the neural network. The existing optimizations consider only the relationship of X and Y, so that they mimic a function that is to be learned. However, focusing only on the input-output relationships may make the model overfit to the training data, which reduces generalization power and thus exposing chances to generate adversarial samples. In the illustrative embodiments, however, Delta considers the relationship between X and X', which has been neglected in previous mechanisms, and as a result, prevents overfitting that causes two similar inputs classified as different classes.

The illustrative embodiments reduce or eliminate the attacker's ability to cause a neural network or other cognitive or machine learning model (assumed herein for illustration purposes to be a neural network) to misclassify input data by introducing perturbations into inputs into the neural network, by hardening the neural network against an attacker using gradients of the loss surface of the neural network to generate an adversarial input to the neural network. The hardening of the neural network is achieved through training of the neural network, i.e. training of the weights of the nodes in the neural network and/or other operational parameters, which minimizes a modified loss function. The modified loss function takes into account small differences between inputs and forces such small differences to result in small differences in outputs of the neural network that do not cross boundaries between classifications. This eliminates an attacker's ability to cause misclassification by making small perturbations to input data and thus, hardens the neural network against such gradient based attacks.

Thus, the mechanisms of the illustrative embodiments improve the operation of the neural network, and the cognitive system implementing the neural network, by adding additional non-generic functionality that previously did not exist in the neural network mechanism or cognitive system, specifically for hardening the neural network and cognitive system against adversarial attacks by providing new training logic and neural network training operations. The mechanisms of the illustrative embodiments add additional technological logic in the training of the neural network and cognitive system that specifically implements the hardening of the neural network against perturbations or small differences in input data.

The mechanisms of the illustrative embodiments are specific to a technological environment involving one or more data processing systems and/or computing devices that are specifically configured to implement the additional logic of the present invention thereby resulting in a non-generic technological environment comprising one or more non-generic data processing systems and/or computing devices. Moreover, the illustrative embodiments are specifically directed to solving the technological problem of hardening neural networks, cognitive models, or machine learning models against adversarial attacks by training the neural networks, cognitive models, or machine learning models using additional reference inputs, a new loss function, and logic for minimizing the new loss function and thereby training the neural network or model so as to reduce the difference in output of the neural network or model due to small difference in the input.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
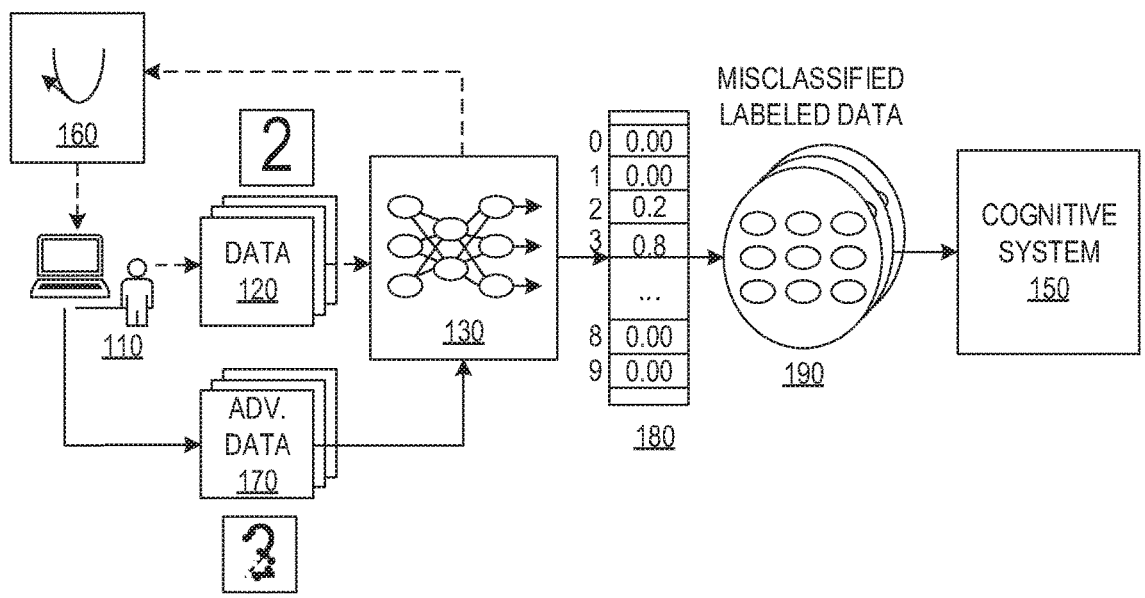

As noted above, the present invention provides mechanisms for protecting cognitive systems, such as those comprising neural networks and/or deep learning mechanisms, from gradient based attacks, such as an evasion attack or other adversarial input. FIGS. 1A and 1B are block diagrams illustrating the problem addressed by the present invention. In the depiction of FIGS. 1A and 1B, it is assumed that a neural network model has been trained using training data, such as through a supervised or semi-supervised process using a ground truth data structure or the like, or any other known or later developed methodology for training a neural network model.

The example shown in FIGS. 1A and 1B assumes that the neural network model is being used to perform a classification operation on an image of a number to thereby classify the image of the number as a number from "0" to "9". This is used only as an example of one possible simple classification operation that the neural network model may be used to perform and is not to be considered limiting on the applications of a neural network model with which the mechanisms of the illustrative embodiments may be implemented. As noted above, the mechanisms of the illustrative embodiments may be utilized with the inputs/outputs of any neural network models, machine learning models, or the like, regardless of the particular artificial intelligence operations performed by the neural network models, machine learning models, or the like. Moreover, although not shown explicitly in FIG. 1, the neural network model, machine learning model, deep learning or cognitive model, or the like, may be part of a more complex cognitive system that implements such a model to perform a complex cognitive operation, such as natural language processing, image analysis, patient treatment recommendation, medical imaging analysis, cognitive security system, or any of a plethora of other cognitive operations, as described hereafter.

For example, the cognitive system may provide input data to the hardened neural network that is a data sample of at least one of image data, audio data, or textual data. The hardened neural network may operate on the input data to generate an output vector specifying probabilities of the input data being properly classified into different predetermined classes. Moreover, the cognitive system logic may operate on the data sample, based on the classification probabilities, to classify the data sample according to the cognitive operation of the cognitive system. The cognitive operation may include one of an image analysis operation, a speech recognition operation, an audio recognition operation, a social network filtering operation, a machine translation operation, a natural language processing operation, a patient treatment recommendation operation, a medical imaging analysis operation, or a bioinformatics operation.

As shown in FIG. 1A, under normal operation, the neural network model 130 receives a set of input data 120 from a data source 110, which is processed through the neural network model to generate a vector output 135. In the depicted example of FIG. 1A, the trained neural network 130 performs a classification operation for classifying the input data set 120. The output of the classification operation is a vector 135 of probability values where each slot of the vector output 135 represents a separate possible classification of the input data set 120. The training of a neural network, machine learning, deep learning, or other artificial intelligence model involves modifying weighting values associated with various features scored by nodes of the model based on training data sets to cause the model to output a correct vector output 135 labeling the input data set 120 correctly based on supervised or semi-supervised feedback. The neural network model 130 processes the input data set 120 through the various levels of nodes in the neural network model 130 to generate, at the output nodes, probability values corresponding to the particular class or label that the output node represents, i.e. the output node's value indicates the probability that the class or label of the corresponding vector output slot applies to the input data set 120.

Thus, in a classification operation, each vector slot of the vector output 135 corresponds to a classification (or class) into which the input data may be classified, with a corresponding output node of the neural network model 130 providing the value to be stored in the corresponding vector slot. The value in the vector slot represents a probability that the input data is properly classified into the corresponding class associated with the vector slot. For example, in the depiction of FIGS. 1A and 1B, the classes are the numerical values 0 to 9, each numerical value being associated with a separate vector slot, and each vector slot having a value ranging from 0.00 (0% probability) to 1.00 (100% probability) indicating a probability that the corresponding class 0 to 9 is the correct class for the input data 120. For example, if the input data 120 represents an image of the number "2", then if the neural network model 130 has been trained correctly, then processing of the input data 120 by the neural network model 130 will result in a relatively high probability that the classification of the input data 120 is that it represents the number "2" and hence is in class "2." As shown in FIG. 1A, the probability for class "2" is 0.90 while the probability for class "3" is 0.10 and all other classes have a 0.00 probability. It should be appreciated that while the figure shows a precision of two decimal places for the probability values, this is merely used for illustration purposes and any desirable precision of the values stored in the vector output 135 may be used without departing from the spirit and scope of the present invention.

While this is a simple example used for illustrative purposes, it should be appreciated that the number of classifications and corresponding labels, as well as the corresponding vector output 135, may be quite complex. As another example, these classifications may be, for example, in a medical imaging application where internal structures of human anatomy are being classified in a patient's chest, e.g., an aorta, a heart valve, a left ventricle, right ventricle, lungs, etc. It should be appreciated that the vector output 135 may comprise any number of potential vector slots, or classifications, at various levels of granularity depending on the particular application and implementation, and the vector output 135 may be of various sizes correspondingly.

The resulting vector output 135 is used to generate labels or metadata that is associated with the input data 120 to generate labeled data set 140. A labeled data set 140 is a set of output data generated by the trained neural network model 130 where the unlabeled input data is augmented with additional tags or labels of meaningful information for the particular cognitive operation for which the data is to be used. For example, in a patient treatment recommendation cognitive system, the labeled data may comprise labels, tags, or annotations that specify various medical concepts with which the data is associated, e.g., a disease, a treatment, a patient's age, a patient's gender, etc. In the depicted example, the operation of the neural network model 130 is to classify a portion of an input image specified in a set of input data 120 into one of 10 categories representing numerical values that the portion of the input image represents, e.g., classes "0" to "9". Thus, the label that is affixed to a set of input data 120 may be a label of "0" or "1" or "2", etc.

Thus, the classification generated by the neural network 130 is used to associate an appropriate label of one or more of the classes in the vector output 135 based on the corresponding values stored in the vector slots for those classes. For example, the highest ranking class may be selected for use in labeling the input data. In some implementations, multiple classes may be represented in the labels generated and associated with the input data 120 to generate the labeled data 140, e.g., classes having a probability value greater than a predetermined threshold may have labels generated and associated with the input data 120 to generate the labeled data 140.

The labeled data 140 is then input to the cognitive system 150 for performance of cognitive operations on the labeled data 140. The particular cognitive operation performed by the cognitive system 150 depends on the cognitive system and may be any of a plethora of different types of cognitive operations. Examples of cognitive operations include various types of decision making operations or decision support operations, such as security system based operations for controlling access to facilities, data, or any other secure asset. Such security system cognitive operations may employ the labeled data 140 to perform facial recognition, voice print recognition, biometrics based decision making, or the like. Other implementations of the cognitive system 150 may involve various types of natural language processing, such as for question answering or request processing, image analysis, such as for medical image analysis for patient diagnosis and treatment recommendations, or any other evaluation of an input data for purposes of making decisions and generating results in which the cognitive system emulates human thought processes.

As shown in FIG. 1B, assuming that the data source 110 is an attacker 110 performing a white box gradient based attack, such as an evasion attack, the attacker 110 may attempt to cause the neural network 130 to misclassify the input data 120 by modifying the input data 120 to include imperceptible manipulations on the input data 120 and thereby generate adversarial input 170. In order to generate the adversarial data 170, the attacker 110 may analyze the loss surface 160 of the neural network model 130 to determine an appropriate gradient that shows the least manipulation of the input data that causes the greatest change in the classification performed by the neural network model 130. For example, the attacker may access the neural network, or a copy of the neural network, or may perform a model stealing attack by querying the model to label unlabeled data and train their own copy of the model. Thereafter, obtaining the loss surface is straightforward, as it is defined inside the neural network. For example, if the neural network is a function f, mapping input x to f(x), the loss given x and its label y is $L(f(x),y)$. This function L is usually defined when the neural network is defined and thus, is part of the neural network. Typical examples include cross entropy loss and mean squared error. The gradient the attacker needs to compute is the gradient of $L(f(x),y))$.

The selected gradient is from the loss surface 160 is then used to inject manipulations into the input data 120 to generate the adversarial input data 170 which is intended to fool the neural network model 130 to misclassify the actual input data 120 due to the injected manipulations. Thus, rather than generating the output vector 135 of FIG. 1A for the input data 120, the neural network model 130 generates the manipulated output vector 180 in FIG. 1B based on the adversarial input data 170, which causes a misclassification of the input data 120. In this case, rather than the input image of the value "2" being recognized as having class "2", the neural network model 130 processes the adversarial input data 170 and determines there to be a higher probability that the input data represents the numerical value "3" and outputs a corresponding manipulated output vector 180. The result is a misclassified labeled data set 190 that is input to the cognitive system 150 which in turn performs an incorrect cognitive operation due to the misclassification by the neural network 130, due to the adversarial input 170, which is reflected in the misclassified labeled data set 190. Thus, one can imagine that an attacker may cause the neural network 130 to perceive an invalid input as a valid input, or vice versa, and may be able to obtain access to assets that the attacker may otherwise not be permitted access, for example.

Figure 2:
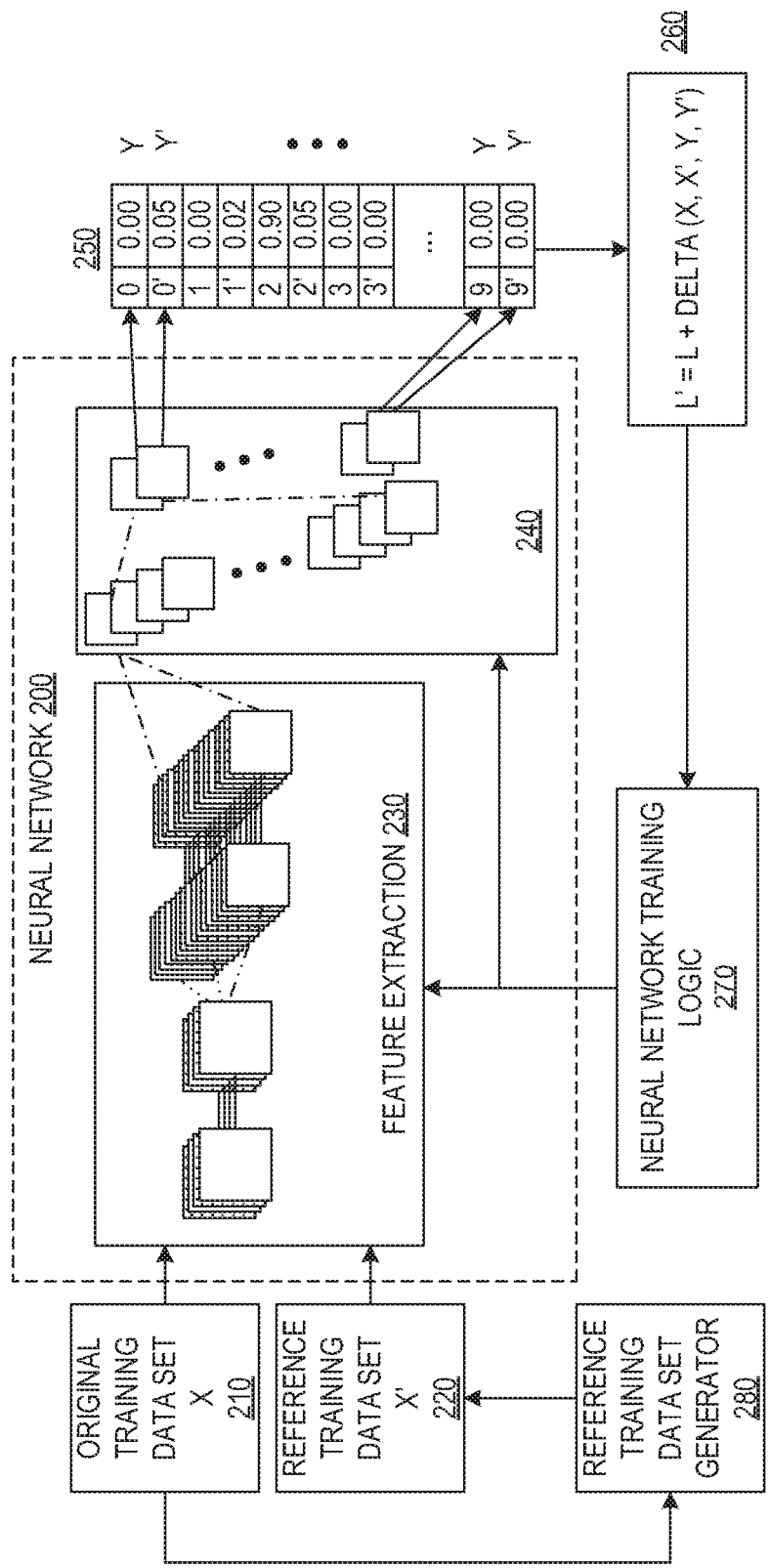
FIG. 2 is an example block diagrams illustrating the separate training of a modified model according to one illustrative embodiment.

FIG. 2 is an example block diagram illustrating the separate training of a modified neural network model according to one illustrative embodiment. As shown in FIG. 2, the neural network 200 includes a feature extraction portion 230 and a classification portion 240. In a convolutional neural network 200, such as that shown in FIG. 2, feature extraction portion 230 has one or more layers of nodes for performing feature mappings based on the input received. The classification portion 240 comprises one or more layers of nodes that classify the input according to the extracted features by evaluating the various features in accordance with one or more criteria. The classification portion 240 terminates in a layer of output nodes that output the probability values for the various classifications associated with those output nodes. The probabilities represent the probability that the corresponding class is the correct class for the input data, e.g., the probability that the image input is the image of the numeral "2". The links between nodes are typically weighted with the weights being learned through a machine learning process involving training based on various training data sets.

With the mechanisms of the illustrative embodiments, the classification portion 240 of the neural network 200 is provided with two sets of output nodes instead of the standard single set of output nodes. The first set of output nodes provides outputs of the feature extraction and classification based on the original, unperturbed, training data set X 210. A second set of output nodes provides outputs of the feature extraction and classification based on a reference training data set X' 220. The reference training data set X' 220 may be generated by the reference training data set generator 280 in various ways, such as by way of sampling the original training data set X, introducing perturbations into the original training data set X 210, such as by way of a fast gradient sign methodology or the like, or any other methodology that generates a reference training data set X' 220.

Thus, the original training data set X 210 is input to the neural network 200 which processes the original training data set X 210 to generate a first set of output values Y in output set 250. The reference training data set X' 220, generated by the reference training data set generator 280 based on the original training data set X 210, is also input to the neural network 200 which generates the outputs Y' in the output data set 250. In some illustrative embodiments, the reference training data set X' is input at the same time as the original training data set X 210 and processed. For example, a given neural network is a function f mapping input x to f(x), where the true label of x is y. The hardened network is a function g, mapping (x, x') to (f(x), f(x)'), and the function g may be learned (and thus f), by optimizing both $L(f(x), y)$ and Delta (x, x', f(x), f(x')), where L is the loss and Delta is as defined above. After the optimization, the function f part of g is utilized.

Based on the outputs Y and Y', as well as the inputs X and X', a modified loss function is calculated by loss function logic 260 for the neural network 200. The modified loss function, in one illustrative embodiments, is a combination of the original loss function L of the neural network 200, and a function of the difference between the input training data set X 210 and the reference training data set X', as well as the difference between the outputs Y and Y', e.g., the modified loss function L'=L+Delta(X, X', Y, Y') where Delta(X, X', Y, Y')=cos(X, X')/cos(Y, Y'), and cos is cosine similarity.

The modified loss function is provided to neural network training logic 270 which operates to generate modifications to the operational parameters and/or weights of the nodes of the neural network 200 to minimize the modified loss function L'. The neural network 200 is then modified by the modifications determined by the neural network training logic 270 and the training is repeated. The training may be repeated in this manner until a convergence of the training occurs, i.e. an amount of change in the modified loss function L' due to the modifications in the operational parameters and weights of nodes is equal to or less than a predetermined threshold amount of change.

The training of the neural network 200 in this manner, by minimizing the modified loss function L' that combines the original loss function L of the neural network 200 with a function of the difference between the inputs X, X' and the outputs Y, Y', the neural network 200 is trained to make small changes in the inputs X, X' correlated to small differences in the outputs Y, Y' rather than allowing small changes in the input X, X' to result in large differences in the outputs Y, Y'. Hence, by forcing small changes in the input to cause only small changes in the output of the neural network, adversarial input based attacks, e.g., evasion or other gradient based attacks, are rendered ineffectual as the small perturbations will not appreciably affect the output of the neural network. To the contrary, with a neural network 200 hardened by the training of the illustrative embodiments, if an adversary wishes to cause a large change in the output, i.e. going from Y to Y', of the neural network 200, the adversary would need to make relatively large and noticeable changes to the input data, i.e. X', fed into the neural network 200, leading to detection and instigation of other mechanisms to prevent such input from causing unwanted operations of the cognitive system.

Once the neural network 200 is trained and hardened against adversarial attacks, the hardened neural network 200 may be used with actual data to perform its classification operations, e.g., classifying objects in images or the like. In operation, if an adversarial input is received, the small changes in input data present in the adversarial input does not cause the neural network 200 to misclassify the input.

Figure 3:
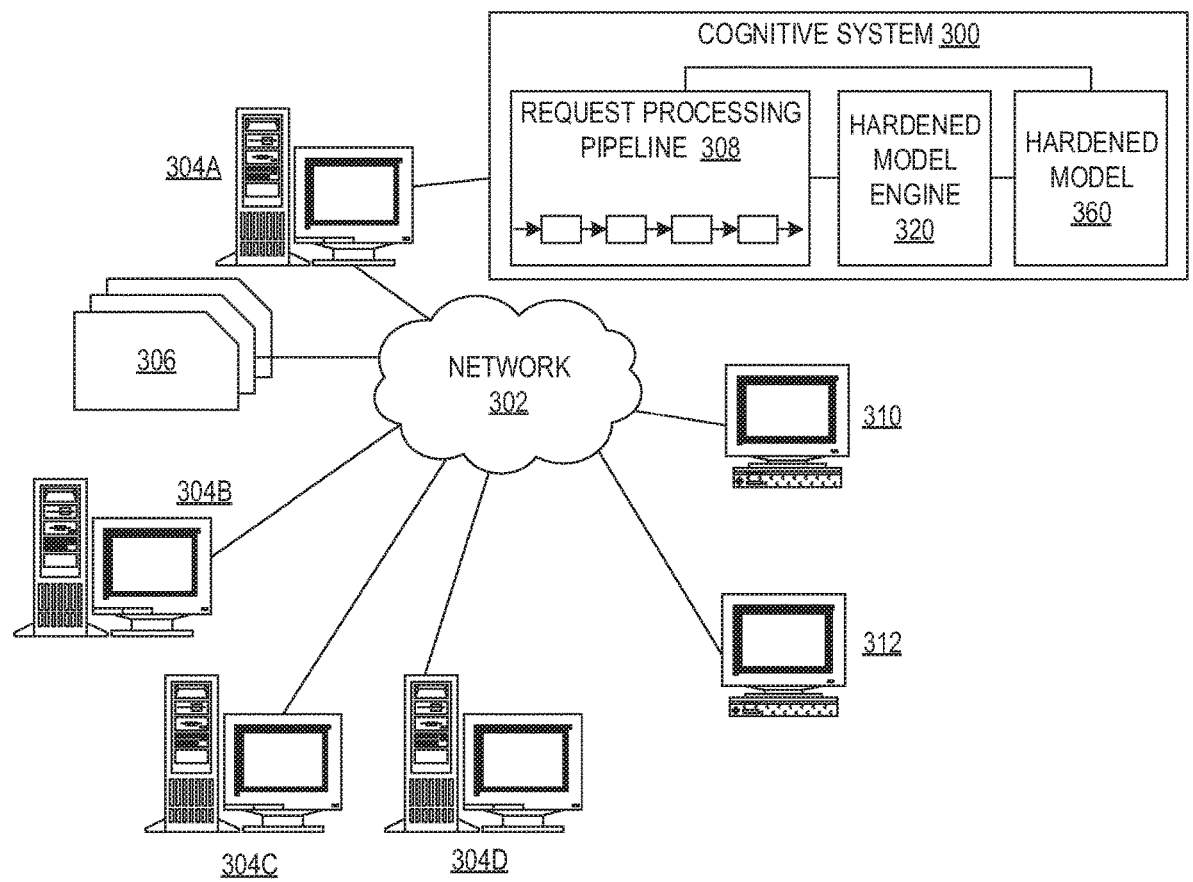
FIG. 3 is a block diagram of an example cognitive system in which aspects of the illustrative embodiments are implemented.
Figure 4:
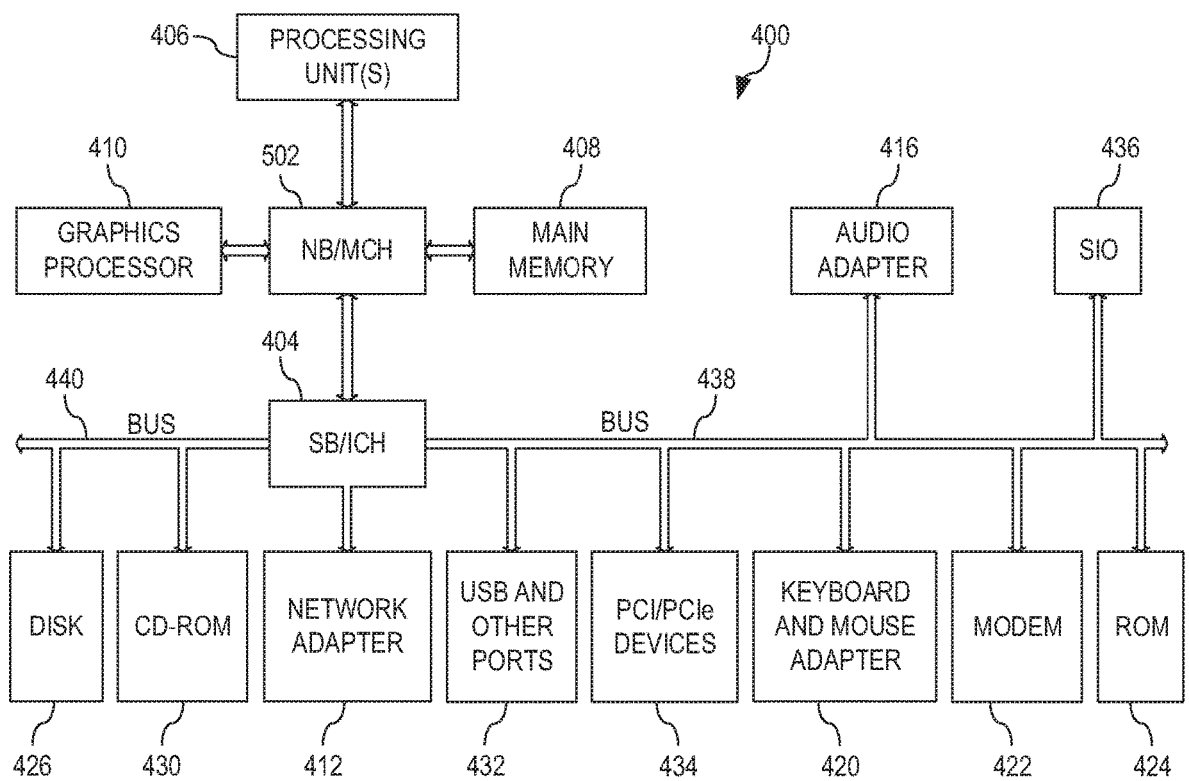
FIG. 4 is an example diagram of a data processing system in which aspects of the illustrative embodiments may be implemented.

As noted above, the mechanisms of the illustrative embodiments are directed to protecting trained neural network models, machine learning models, deep learning models, and the like, implemented in specialized logic of specially configured computing devices, data processing systems, or the like, of a technological environment. As such, the illustrative embodiments may be utilized in many different types of data processing environments. In order to provide a context for the description of the specific elements and functionality of the illustrative embodiments, FIGS. 3-4 are provided hereafter as example environments in which aspects of the illustrative embodiments may be implemented. It should be appreciated that FIGS. 3-4 are only examples and are not intended to assert or imply any limitation with regard to the environments in which aspects or embodiments of the present invention may be implemented. Many modifications to the depicted environments may be made without departing from the spirit and scope of the present invention.

FIGS. 3-4 are directed to describing an example cognitive system which implements a request processing pipeline, request processing methodology, and request processing computer program product with which the mechanisms of the illustrative embodiments are implemented. These requests may be provided as structured or unstructured request messages, either manually created or automatically created by another computing device, such as an image capture system, e.g., security system or the like. In some illustrative embodiments, the requests may be in the form of, or include, input data sets that are to be classified in accordance with a cognitive classification operation performed by a machine learning, neural network, deep learning, or other artificial intelligence based model that is implemented by the cognitive system. The input data sets may represent various types of input data depending upon the particular implementation, such as audio input data, image input data, textual input data, or the like. For example, in one possible implementation, the input data set may represent a medical image, such as an x-ray image, CT scan image, MRI image, or the like, that is to have portions of the image, or the image as a whole, classified into one or more predefined classifications. In other possible implementations, the input data set may represent facial images, images of text, biometric images, natural language text content, or any other type of input that may be represented as data and for which a classification operation is to be performed so as to perform a cognitive operation by a cognitive system.

It should be appreciated that classification of input data may result in a labeled set of data that has labels or annotations representing the corresponding classes into which the non-labeled input data set is classified. This may be an intermediate step in performing other cognitive operations by the cognitive system that support decision making by human users, e.g., the cognitive system may be a decision support system. For example, in a medical domain, the cognitive system may operate to perform medical image analysis to identify anomalies for identification to a clinician, patient diagnosis and/or treatment recommendation, drug interaction analysis, or any of a plethora of other possible decision support operations. In a security domain, the cognitive system may operate to control access to physical premises, data assets, computing assets, or any other type of asset to which access is to be restricted. In other domains, the cognitive system may perform different types of decision making operations or decision support operations based on the desired implementation.

It should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests, depending on the desired implementation. For example, in some cases, a first request processing pipeline may be trained to operate on input requests directed to a medical image analysis, while a second request processing pipeline may be configured and trained to operate on input requests concerning patient electronic medical record (EMR) analysis involving natural language processing. In other cases, for example, the request processing pipelines may be configured to provide different types of cognitive functions or support different types of applications, such as one request processing pipeline being used for patient treatment recommendation generation, while another pipeline may be trained for financial industry based forecasting, etc.

Moreover, each request processing pipeline may have their own associated corpus or corpora that they ingest and operate on, e.g., one corpus for medical treatment documents and another corpus for financial industry domain related documents in the above examples. In some cases, the request processing pipelines may each operate on the same domain of input questions but may have different configurations, e.g., different annotators or differently trained annotators, such that different analysis and potential answers are generated. The cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

The illustrative embodiments may be integrated in, augment, and extend the functionality of the request processing pipeline by providing mechanisms to protect the models implemented in these pipelines, or by the cognitive system as a whole, from adversarial attacks, e.g., gradient based attacks, evasion attacks, or the like. In particular, in portions of the cognitive system in which the trained neural network models, machine learning models, deep learning models, or the like, are employed to generate labeled data set outputs, the mechanisms of the illustrative embodiments may be implemented to train the neural network or other machine learning or cognitive model so as to cause the neural network, machine learning, or cognitive model to properly classify adversarial inputs with small perturbations.

FIG. 3 is an example block diagram of one type of cognitive system in which the hardened model may be implemented in accordance with one illustrative embodiment. FIG. 4 is an example block diagram of a data processing system or computing device that may be used to implement a server or client computing device in accordance with one illustrative embodiment. It should be appreciated that the mechanisms described in FIGS. 3-4 are only examples and are not intended to state or imply any limitation with regard to the type of cognitive system mechanisms with which the illustrative embodiments are implemented. Many modifications to the example cognitive system shown in FIGS. 3-4 may be implemented in various embodiments of the present invention without departing from the spirit and scope of the present invention.

With reference again to FIG. 3, as an overview, a cognitive system, such as cognitive system 300, is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, image analysis logic, or the like, and machine learning logic, which may be provided as specialized hardware, software executed on hardware, or any combination of specialized hardware and software executed on hardware. This logic may implement one or more models, such as a neural network model, a machine learning model, a deep learning model, that may be trained for particular purposes, for supporting the particular cognitive operations performed by the cognitive system. In accordance with the mechanisms of the illustrative embodiments, the logic further implements a hardened model engine for training the model, e.g., neural network, using the modified loss function engine 260, neural network training logic 270, and reference training data set generator 280. In this way, the hardened model engine 320 fortifies the neural network, or hardened model 360, from evasion or gradient based attacks.

The logic of the cognitive system 300 implements the cognitive computing operation(s), examples of which include, but are not limited to, question answering, identification of related concepts within different portions of content in a corpus, security operations for controlling access to premises or assets, intelligent search algorithms, such as Internet web page searches, for example, medical diagnostic and treatment recommendations, other types of recommendation generation, e.g., items of interest to a particular user, potential new contact recommendations, etc., image analysis, audio analysis, and the like. The types and number of cognitive operations that may be implemented using the cognitive system of the illustrative embodiments are vast and cannot all be documented herein. Any cognitive computing operation emulating decision making and analysis performed by human beings, but in an artificial intelligence or cognitive computing manner, is intended to be within the spirit and scope of the present invention. IBM Watson™ is an example of one such cognitive computing system which can process input data and applying logic emulating human analysis and thought processes.

The cognitive system 300 may receive input data and classify the input data utilizing the hardened model 360 that is hardened through the operation of the hardened model engine 320 implementing training mechanisms of one of the illustrative embodiments. The classification of the input data may be input to the request processing pipeline 308 to assist with the processing by the request processing pipeline 308 of the input data. The request processing pipeline 308 may applying one or more generated queries to a corpus of data, generate a set of hypotheses, or candidate responses, by looking across the corpus of data for portions of the corpus of data that have some potential for containing a valuable response to the request. The request pipeline 308 performs deep analysis on the input data using a variety of reasoning algorithms which may operate on the output of the hardened model 360. There may be hundreds or even thousands of reasoning algorithms applied, each of which performs different analysis and generates a score. For example, some reasoning algorithms may look at the matching of particular classified elements of the input data to particular rules or logic that, alone, or in combination with other reasoning algorithms operating on other classified elements, to determine a response to the request and input data. Other reasoning algorithms may look at temporal or spatial features in the input data, movement in video images, etc.

The scores obtained from the various reasoning algorithms indicate the extent to which the potential response is inferred by the input request/data based on the specific area of focus of that reasoning algorithm. Each resulting score is then weighted against a statistical model. The statistical model captures how well the reasoning algorithm performed at establishing the inference between input request/data and the corresponding result of the evaluation of the input request/data. The statistical model is used to summarize a level of confidence that the request pipeline 308 has regarding the evidence that the potential response is inferred by the request and/or input data. This process is repeated for each of the candidate responses until the pipeline 308 identifies candidate responses that surface as being significantly stronger than others and thus, generates a final response, or ranked set of responses, for the input request and/or data.

FIG. 3 depicts a schematic diagram of one illustrative embodiment of a cognitive system 300 implementing a request processing pipeline 308, which in some embodiments may be a question answering (QA) pipeline, in a computer network 302. The cognitive system 300 is implemented on one or more computing devices 304A-D (comprising one or more processors and one or more memories, and potentially any other computing device elements generally known in the art including buses, storage devices, communication interfaces, and the like) connected to the computer network 302. For purposes of illustration only, FIG. 3 depicts the cognitive system 300 being implemented on computing device 304A only, but as noted above the cognitive system 300 may be distributed across multiple computing devices, such as a plurality of computing devices 304A-D. The network 302 includes multiple computing devices 304A-D, which may operate as server computing devices, and 310-312 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 300 and network 302 enables cognitive functionality for one or more cognitive system users via their respective computing devices 310-312. In other embodiments, the cognitive system 300 and network 302 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 300 may be used with components, systems, sub-systems, and/or devices other than those that are depicted herein.

The cognitive system 300 is configured to implement a request processing pipeline 308 that receive inputs from various sources. The requests may be posed in the form of a natural language question, natural language request for information, natural language request for the performance of a cognitive operation, or the like. Alternatively, the "request" may simply be the input of data that is intended to be operated on by the cognitive system, e.g., images, text, audio input, or the like, which is to be classified by the hardened model of the illustrative embodiments and then operated on by cognitive processes to generate a result of a cognitive operation. For example, the cognitive system 300 receives input from the network 302, a corpus or corpora of electronic documents 306, cognitive system users, image capture devices, audio capture devices, biometric scanners, textual message interception devices, and/or other data sources and other possible sources of input.

In one embodiment, some or all of the inputs to the cognitive system 300 are routed through the network 302. The various computing devices 304A-D on the network 302 include access points for content creators and cognitive system users. Some of the computing devices 304A-D include devices for a database storing the corpus or corpora of data 306 (which is shown as a separate entity in FIG. 3 for illustrative purposes only). Portions of the corpus or corpora of data 306 may also be provided on one or more other network attached storage devices, in one or more databases, or other computing devices not explicitly shown in FIG. 3. The network 302 includes local network connections and remote connections in various embodiments, such that the cognitive system 300 may operate in environments of any size, including local and global, e.g., the Internet.

Depending on the particular domain and implementation of the cognitive system, the corpus or corpora of data 306 may take many different forms. In a natural language implementation, the corpus or corpora 306 may be composed of natural language unstructured documents, structured documents, or the like. In a domain in which image analysis is being performed, the corpus or corpora 306 may include image data for various types of entities. In an audio analysis domain, the corpus or corpora 306 may contain audio patterns representing different entities or sources of audible sounds. The content of the corpus or corpora 306 may vary depending on the type of data needed to perform cognitive operations.

In one embodiment, the content creator creates content in a document of the corpus or corpora of data 306 for use as part of a corpus of data with the cognitive system 300. The document includes any file, text, article, or source of data for use in the cognitive system 300. Cognitive system users access the cognitive system 300 via a network connection or an Internet connection to the network 302, and input questions/requests to the cognitive system 300 that are answered/processed based on the content in the corpus or corpora of data 306. In one embodiment, the questions/requests are formed using natural language. The cognitive system 300 parses and interprets the question/request via a pipeline 308, and provides a response to the cognitive system user, e.g., cognitive system user 310, containing one or more answers to the question posed, response to the request, results of processing the request, or the like. In some embodiments, the cognitive system 300 provides a response to users in a ranked list of candidate answers/responses while in other illustrative embodiments, the cognitive system 300 provides a single final answer/response or a combination of a final answer/response and ranked listing of other candidate answers/responses.

The cognitive system 300 implements the pipeline 308 which comprises a plurality of stages for processing an input question/request based on information obtained from the corpus or corpora of data 306. The pipeline 308 generates answers/responses for the input question or request based on the processing of the input question/request and the corpus or corpora of data 306.

In some illustrative embodiments, the cognitive system 300 may be the IBM Watson™ cognitive system available from International Business Machines Corporation of Armonk, N.Y., which is augmented with the mechanisms of the illustrative embodiments described hereafter. A pipeline of the IBM Watson™ cognitive system receives an input question or request which it then parses to extract the major features of the question/request, which in turn are then used to formulate queries that are applied to the corpus or corpora of data 306. Based on the application of the queries to the corpus or corpora of data 306, a set of hypotheses, or candidate answers/responses to the input question/request, are generated by looking across the corpus or corpora of data 306 for portions of the corpus or corpora of data 306 (hereafter referred to simply as the corpus 306) that have some potential for containing a valuable response to the input question/response (hereafter assumed to be an input question). The pipeline 308 of the IBM Watson™ cognitive system then performs deep analysis on the language of the input question and the language used in each of the portions of the corpus 306 found during the application of the queries using a variety of reasoning algorithms.

The scores obtained from the various reasoning algorithms are then weighted against a statistical model that summarizes a level of confidence that the pipeline 308 of the IBM Watson™ cognitive system 300, in this example, has regarding the evidence that the potential candidate answer is inferred by the question. This process is repeated for each of the candidate answers to generate ranked listing of candidate answers which may then be presented to the user that submitted the input question, e.g., a user of client computing device 310, or from which a final answer is selected and presented to the user. More information about the pipeline 308 of the IBM Watson™ cognitive system 300 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, while the input to the cognitive system 300 from a client device may be posed in the form of a natural language question, the illustrative embodiments are not limited to such. Rather, the input question may in fact be formatted or structured as any suitable type of request, or simply as a set of input data to be processed, which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis. Such processing may alternatively, or in addition, include image analysis, audio analysis, textual image analysis, biometrics analysis, or any other type of cognitive analysis that utilizes neural network, machine learning, or other cognitive models which may be trained and hardened against gradient based attacks in accordance with the illustrative embodiments.

Regardless of the manner by which the question or request is input to the cognitive system 300, the processing of the request or question involves the application of a trained model, e.g., neural network model, machine learning model, deep learning (cognitive) model, etc., to an input data set as described previously above. This input data set may represent features of the actual request or question itself, data submitted along with the request or question upon which processing is to be performed, or the like. The application of the trained model to an input data set may occur at various points during the performance of the cognitive computing operations by the cognitive system. For example, the trained model may be utilized during feature extraction and classification by a feature extraction stage of processing of the request or input question, e.g., taking a natural language term in the request or question and classifying it as one of a plurality of possible concepts that the term corresponds to, e.g., classifying the term "truck" in an input question or request into a plurality of possible classes, one of which may be "vehicle". As another example, a portion of an image comprising a plurality of pixel data may have the trained model applied to it to determine what the object is that is in the portion of the image. The mechanisms of the illustrative embodiments operate on the output of the trained model as discussed previously above, which may be an intermediate operation within the overall cognitive system's cognitive computing operations, e.g., classification of a portion of a medical image into one of a plurality of different anatomical structures may be an intermediate operation to performing an anomaly identification and treatment recommendation cognitive computing operation.

As shown in FIG. 3, the cognitive system 300 is further augmented, in accordance with the mechanisms of the illustrative embodiments, to include logic implemented in specialized hardware, software executed on hardware, or any combination of specialized hardware and software executed on hardware, for implementing a hardened model engine 320. The hardened model engine 320 may be provided as an external engine to the logic implementing the trained model 360. The hardened model engine 320 operates to modify and train an existing model, e.g., neural network, or create a new protected model or neural network. This is accomplished, as described above, by training the neural network to minimize a modified loss function that forces small changes in input data to result in only small changes in the output data, thereby avoiding misclassification by the trained model 360. Thus, correct classification and labeling of the input data set is still performed while protecting or hardening the neural network (model) against gradient based attacks, such as evasion attacks. The resulting classified or labeled data set may be provided to various stages of processing downstream in the pipeline 308 for further processing and performance of the overall cognitive operation for which the cognitive system 300 is employed.

Thus, an attacker, such as a user of client computing device 310 or the like, is not able to correctly utilize the gradient of the actual loss surface of the original model (neural network) so as to be able to generate adversarial input that would fool the classification performed by the neural network, i.e. hardened model 360. To the contrary, the training performed by the mechanisms of the illustrative embodiments causes gradient based, or small perturbation based, attacks to be ineffectual as the classification performed by the trained model 360 comprises operational parameters or weights associated with nodes that causes small changes in input data to not result in large changes in output classification probabilities. As a result, the attacker would need to make large changes in the input data, or large perturbations, in order to make the hardened model 360 output a different set of classification probabilities. Such large changes or perturbations will be recognized as attack attempts and will still be classified correctly by the hardened model 360.

It should be appreciated that while FIG. 3 illustrates the implementation of the trained and hardened model logic 360 as part of a cognitive system 300, the illustrative embodiments are not limited to such. Rather, in some illustrative embodiments, the trained model logic 360 itself may be provided as a service from which a user of a client computing device 310, may request processing of an input data set. Moreover, other providers of services, which may include other cognitive systems, may utilize such a trained model 360 to augment the operation of their own cognitive systems. Thus, in some illustrative embodiments the trained model logic 360 may be implemented in one or more server computing devices, accessed via one or more APIs via other computing devices through which input data sets are submitted to the trained model logic 360, and corresponding labeled data sets are returned. Thus, the integration of the mechanisms of the illustrative embodiments into a cognitive system 300 is not required, but may be performed depending on the desired implementation.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 4 is provided as an example of one type of data processing system in which aspects of the present invention may be implemented. Many other types of data processing systems may be likewise configured to specifically implement the mechanisms of the illustrative embodiments.

FIG. 4 is a block diagram of an example data processing system in which aspects of the illustrative embodiments are implemented. Data processing system 400 is an example of a computer, such as server computing device 304A or client computing device 310 in FIG. 3, in which computer usable code or instructions implementing the processes for illustrative embodiments of the present invention are located. In one illustrative embodiment, FIG. 4 represents a server computing device, such as a server 304A, which implements a cognitive system 300 and request or QA system pipeline 308 augmented to include the additional mechanisms of the illustrative embodiments described herein with regard to a hardened model engine 320 for protecting the trained neural network, machine learning, deep learning, or other artificial intelligence model logic from gradient based attacks.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 is connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 is connected to SB/ICH 404.

An operating system runs on processing unit 406. The operating system coordinates and provides control of various components within the data processing system 400 in FIG. 4. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 400.

As a server, data processing system 400 may be, for example, an IBM® eServer™ System p® computer system, running the Advanced Interactive Executive (AIX®) operating system or the LINUX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and are loaded into main memory 408 for execution by processing unit 406. The processes for illustrative embodiments of the present invention are performed by processing unit 406 using computer usable program code, which is located in a memory such as, for example, main memory 408, ROM 424, or in one or more peripheral devices 426 and 430, for example.

A bus system, such as bus 438 or bus 440 as shown in FIG. 4, is comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, includes one or more devices used to transmit and receive data. A memory may be, for example, main memory 408, ROM 424, or a cache such as found in NB/MCH 402 in FIG. 4.

Those of ordinary skill in the art will appreciate that the hardware depicted in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3 and 4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

Figure 5:
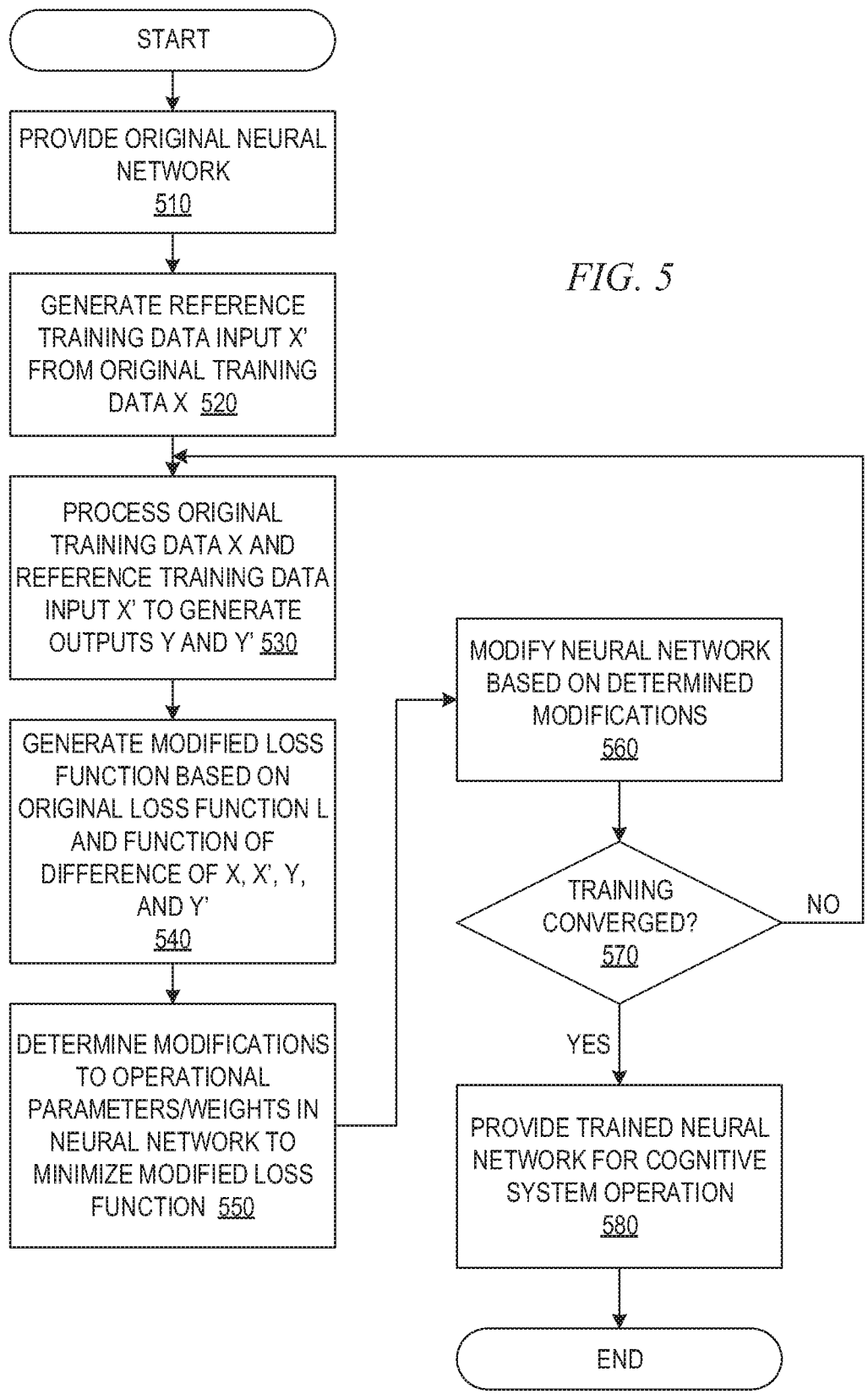
FIG. 5 is a flowchart outlining an example operation for training a model, e.g., neural network, against gradient based attacks in accordance with one illustrative embodiment.

FIG. 5 is a flowchart outlining an example operation for training a model, e.g., neural network, against gradient based attacks in accordance with one illustrative embodiment. As shown in FIG. 5, the operation starts with the providing of an original neural network (step 510). A reference training data input X' is generated from an original training data set X (step 520). As noted above, various methodologies may be employed to perform such reference training data input generation including, for example, sampling from the original training data set X, using an algorithm to introduce perturbations into the original training data set X to generate the reference training data set X', or the like.

The original training data X and the reference training data input X' are processed by the neural network to generate outputs Y and Y', respectively (step 530). A modified loss function is then generated based on the original loss function L and the function of the difference of X, X', Y, and Y' (step 540). Based on this modified loss function, modifications to the operational parameters/weights in the neural network are determined so as to minimize the modified loss function (step 550).

The neural network is then modified based on the determined modifications, e.g., operational parameters are set and/or weights of nodes in the neural network are adjusted based on the determined modifications (step 560). A determination is made as to whether the training has converged or not (step 570). As noted above, convergence may comprise, for example, determining whether or not a change in the operational parameters/weights is equal to or greater than a threshold amount of change. If the amount of change is not equal to or greater than the threshold, then it may be determined that the training has converged. If the training has not converged, then the operation may return to step 530 where additional training of the neural network is performed based on the modified neural network, either using the same training data X and/or reference training data input X' or with new training data and corresponding reference training data input (in which case the operation may return to step 520 instead so that new reference training data input may be generated).

If the training of the neural network has converged, the resulting trained neural network is then ready for deployment for use with new input data and operates on the input data while being hardened against gradient or evasion based attacks (step 580). Thus, the trained neural network may process input data and augment the input data with appropriate labels according to the identified classifications indicated by the probability values generated by the trained neural network. Thereafter, the augmented (labeled) data set may be provided as input to a cognitive computing system that processes the labeled data set to perform a cognitive operation, such as any one or more of an image analysis operation, a speech recognition operation, an audio recognition operation, a social network filtering operation, a machine translation operation, a natural language processing operation, a patient treatment recommendation operation, a medical imaging analysis operation, or a bioinformatics operation that is at least partially based on the classifications identified and the annotations or labels generated for the input data. The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions which are executed by the processor to specifically configure the processor to implement a hardened neural network, the method comprising:
   configuring the data processing system to implement a hardened neural network engine that operates on a neural network to harden the neural network against evasion attacks and generates a hardened neural network;
   generating, by the hardened neural network engine, a reference training data set based on an original training data set;
   processing, by the neural network, the original training data set to generate a first output data set and processing the reference training data set to generate a second output data set;
   calculating, by the hardened neural network engine, a modified loss function of the neural network, wherein the modified loss function is a combination of an original loss function associated with the neural network, and a delta function of a ratio of a similarity between the original training data set and the reference training data set and a similarity between the first output data set and the second output data set; and
   training, by the hardened neural network engine, the neural network based on the modified loss function to generate the hardened neural network, wherein the delta function, Delta, is as follows:

$$\mathrm{Delta}(X,X',Y,Y')=\cos(X,X')/\cos(Y,Y'),$$

wherein X is the original training data set, X' is the reference training data set, Y is the first output data set, Y' is the second output data set, and cos is a cosine similarity function.

2. The method of claim 1, wherein the modified loss function causes differences between data in the original training data set and data in the reference training data set to be commensurate with differences between the corresponding outputs of the hardened neural network.

3. The method of claim 1, wherein generating the reference training data set comprises at least one of performing a perturbation operation on the original training data set to introduce perturbations in the original training data set and generate the reference training data set comprising the original training data set with the introduced perturbations, or performing a sampling operation to sample data from the original training data set to generate the reference training data set.

4. The method of claim 1, wherein training the neural network based on the modified loss function to generate the hardened neural network comprises training the neural network to minimize both the delta function and the original loss function associated with the neural network.

5. The method of claim 1, further comprising:
performing, by the hardened neural network engine, a classification operation to classify an input data into one of a plurality of predefined classes of input data; and
performing, by a cognitive computing system, a reasoning operation based on results of the classification operation.

6. The method of claim 5, wherein performing the reasoning operation based on the results of the classification operation comprises annotating the input data to include a class corresponding to a predefined class having a highest probability value associated with the class as determined by the hardened neural network engine.

7. The method of claim 1, wherein the hardened neural network is hardened against gradient based attacks such that perturbations in input data to the hardened neural network do not cause misclassification by the hardened neural network.

8. The method of claim 1, further comprising:
receiving, by the hardened neural network, input data to be processed;
generating, by the hardened neural network, an output vector comprising a plurality of probability values stored in vector slots, wherein each vector slot is associated with a different class in a plurality of predefined classes such that the probability value stored in a vector slot indicates a probability that the input data is properly classified into a class corresponding to the vector slot;
providing, by the hardened neural network, the output vector to a cognitive system; and
executing, by the cognitive system, a cognitive operation based on the probability values stored in the output vector.

9. The method of claim 8, wherein the input data is a data sample of at least one of image data, audio data, or textual data, and wherein the cognitive model logic operates on the data sample to classify the data sample according to the cognitive operation of the cognitive system, and wherein the cognitive operation is one of an image analysis operation, a speech recognition operation, an audio recognition operation, a social network filtering operation, a machine translation operation, a natural language processing operation, a patient treatment recommendation operation, a medical imaging analysis operation, or a bioinformatics operation.

10. The method of claim 1, wherein the modified loss function, L', is as follows:

$$L'=L+\text{Delta}(X,X',Y,Y'),$$

wherein L is the original loss function associated with the neural network.

11. A computer program product comprising a computer readable storage medium having a computer readable program stored therein, wherein the computer readable program, when executed on a data processing system, causes the data processing system to:
configure the data processing system to implement a hardened neural network engine that operates on a neural network to harden the neural network against evasion attacks and generates a hardened neural network;
generate a reference training data set based on an original training data set;
process, by the neural network, the original training data set and the reference training data set to generate first and second output data sets;
calculate, by the hardened neural network engine, a modified loss function of the neural network, wherein the modified loss function is a combination of an original loss function associated with the neural network, and a delta function of a ratio of a similarity between the original training data set and the reference data set and a similarity between the first output data set and the second output data set; and
train, by the hardened neural network engine, the neural network based on the modified loss function to generate the hardened neural network, wherein the delta function, Delta, is as follows:

$$\text{Delta}(X,X',Y,Y')=\cos(X,X')/\cos(Y,Y'),$$

wherein X is the original training data set, X' is the reference training data set, Y is the first output data set, Y' is the second output data set, and cos is a cosine similarity function.

12. The computer program product of claim 11, wherein the modified loss function causes differences between data in the original training data set and data in the reference training data set to be commensurate with differences between the corresponding outputs of the hardened neural network.

13. The computer program product of claim 11, wherein the computer readable program further causes the data processing system to generate the reference training data set at least by one of performing a perturbation operation on the original training data set to introduce perturbations in the original training data set and generate the reference training data set comprising the original training data set with the introduced perturbations, or performing a sampling operation to sample data from the original training data set to generate the reference training data set.

14. The computer program product of claim 11, wherein the computer readable program further causes the data processing system to train the neural network based on the modified loss function to generate the hardened neural network at least by training the neural network to minimize both the delta function and the original loss function associated with the neural network.

15. The computer program product of claim 11, wherein the computer readable program further causes the data processing system to:

perform, by the hardened neural network engine, a classification operation to classify an input data into one of a plurality of predefined classes of input data; and perform, by a cognitive computing system, a reasoning operation based on results of the classification operation.

16. The computer program product of claim 15, wherein the computer readable program further causes the data processing system to perform the reasoning operation based on the results of the classification operation at least by annotating the input data to include a class corresponding to a predefined class having a highest probability value associated with the class as determined by the hardened neural network engine.

17. The computer program product of claim 11, wherein the hardened neural network is hardened against gradient based attacks such that perturbations in input data to the hardened neural network do not cause misclassification by the hardened neural network.

18. The computer program product of claim 11, wherein the computer readable program further causes the data processing system to:

receive, by the hardened neural network, input data to be processed;

generate, by the hardened neural network, an output vector comprising a plurality of probability values stored in vector slots, wherein each vector slot is associated with a different class in a plurality of predefined classes such that the probability value stored in a vector slot indicates a probability that the input data is properly classified into a class corresponding to the vector slot;

provide, by the hardened neural network, the output vector to a cognitive system; and execute, by the cognitive system, a cognitive operation based on the probability values stored in the output vector.

19. A data processing system comprising:

at least one processor; and at least one memory coupled to the at least one processor, wherein the at least one memory comprises instructions which, when executed by the at least one processor, cause the at least one processor to:

configure the data processing system to implement a hardened neural network engine that operates on a neural network to harden the neural network against evasion attacks and generates a hardened neural network;

generate a reference training data set based on an original training data set;

process, by the neural network, the original training data set and the reference training data set to generate first and second output data sets;

calculate, by the hardened neural network engine, a modified loss function of the neural network, wherein the modified loss function is a combination of an original loss function associated with the neural network, and a delta function of t a ratio of a similarity between the original training data set and the reference data set and a similarity between the first output data set and the second output data set; and train, by the hardened neural network engine, the neural network based on the modified loss function to generate the hardened neural network, wherein the delta function, Delta, is as follows:

$$\mathrm{Delta}(X,X',Y,Y') = \cos(X,X')/\cos(Y,Y'),$$

wherein X is the original training data set, X' is the reference training data set, Y is the first output data set, Y' is the second output data set, and cos is a cosine similarity function.

* * * * *